United States Patent
Rajwade et al.

(10) Patent No.: US 10,504,064 B2
(45) Date of Patent: Dec. 10, 2019

(54) EXTENSIBILITY OF BUSINESS LOGIC SHARED ACROSS A BUSINESS PROCESS ORCHESTRATION ENGINE, A RULE ENGINE, AND A USER INTERFACE

(71) Applicant: BMC SOFTWARE, INC., Houston, TX (US)

(72) Inventors: Abhijit Anirrudha Rajwade, Pune (IN); Steve Wong, Markham (CA); David Lawrence Shapiro, Santa Clara, CA (US); Jiayi Gu, Sunnyvale, CA (US); Girish Kumar Gupta, Pune (IN); David T. Sulcer, Santa Clara, CA (US)

(73) Assignee: BMC Software, Inc., Houston, TX (US)

( * ) Notice: Subject to any disclaimer, the term of this patent is extended or adjusted under 35 U.S.C. 154(b) by 0 days.

(21) Appl. No.: 14/840,954

(22) Filed: Aug. 31, 2015

(65) Prior Publication Data

US 2017/0053243 A1    Feb. 23, 2017

(30) Foreign Application Priority Data

Aug. 18, 2015    (IN) ............................ 4309/CHE/2015

(51) Int. Cl.
     *G06Q 10/10*          (2012.01)

(52) U.S. Cl.
     CPC .................................. *G06Q 10/103* (2013.01)

(58) Field of Classification Search
     CPC ....... G06Q 10/103; G06F 3/0481; G06F 8/30; G06F 8/36; G06F 9/44505; G06F 9/45504
     See application file for complete search history.

(56) References Cited

U.S. PATENT DOCUMENTS

| | | | |
|---|---|---|---|
| 2005/0138634 A1* | 6/2005 | Luty | G06F 17/30861 719/315 |
| 2006/0230396 A1* | 10/2006 | Martinez | G06F 9/4428 717/173 |
| 2008/0271008 A1 | 10/2008 | Dettori et al. | |
| 2009/0172691 A1* | 7/2009 | Barros | G06F 9/526 718/104 |
| 2010/0121740 A1 | 5/2010 | Reed et al. | |

(Continued)

OTHER PUBLICATIONS

"Activiti BPM Platform", available online at <http://activiti.org/>, retrieved on Jul. 17, 2015, 2 pages.
"Ardent Boosts DataStage Product Line", available online at <http://www.informationweek.com/ardent-boosts-datastage-product-line-/d/d-id/1007600?>, retrieved on Jul. 17, 2015, 5 pages.

(Continued)

*Primary Examiner* — Wei Y Zhen
*Assistant Examiner* — Amir Soltanzadeh
(74) *Attorney, Agent, or Firm* — Brake Hughes Bellermann LLP (57) ABSTRACT

In one general aspect, a method can include creating an action, the creating including annotating a block of code with metadata, and encapsulating the annotated block of code into a reusable building block of code. The method can further include publishing the action, the publishing including registering the action in a service registry. The method can further include dynamically discovering the action in the service registry by an application during runtime, invoking the action by the application, and executing the action by the application, the executing performing a method specified by the action.

20 Claims, 7 Drawing Sheets

(56) References Cited

U.S. PATENT DOCUMENTS

| | | | |
|---|---|---|---|
| 2010/0125558 A1 | 5/2010 | Trofin et al. | |
| 2011/0191383 A1* | 8/2011 | Addala | G06F 17/30 |
| | | | 707/797 |
| 2012/0131542 A1* | 5/2012 | DeAngelis | G06F 8/36 |
| | | | 717/104 |
| 2012/0159145 A1* | 6/2012 | Cheong | G06F 8/61 |
| | | | 713/100 |
| 2012/0272190 A1 | 10/2012 | O'Brien et al. | |
| 2014/0068559 A1 | 3/2014 | Szocs | |
| 2014/0075413 A1* | 3/2014 | Binjrajka | G06F 8/71 |
| | | | 717/121 |

OTHER PUBLICATIONS

"Atrium Orchestrator", available online at <http://www.bmcsoftware. in/it-solutions/atrium-orchestrator.html>, retrieved on Jul. 17, 2015, 7 pages.

"Autopilot : The Virtual Colleague", available online at <https:// autopilot.co/index.html>, retrieved on Jul. 17, 2015, 9 pages.

"GraphIT Platform", available online at <https://graphit.co/index. html>, retrieved on Jul. 17, 2015, 9 pages.

"jBPM—Open Source Business Process Management—Process engine", available online at <http://www.jbpm.org/>, retrieved on Jul. 17, 2015, 3 pages.

"InfoSphere DataStage", avaialable online at <http://www-03.ibm. com/software/products/en/ibminfodata>, retrieved on Jul. 17, 2015, 2 pages.

Extended European Search Report for European Application 16182895. 9, dated Jan. 2, 2017, 12 pages.

\* cited by examiner

FIG. 1

```
public class EmailServiceImpl implements EmailService, Service {

202 ⌐  @Action
              ⌐ 208
       public void sendEmailMessage(@ActionParameter(name = "messageTo") String messageTo, ⌐ 210a
                                                                                  ⌐ 210b
204a ⌐    @ActionParameter(name = "messageBody") String messageBody,
                                                                    ⌐ 210c
204b ⌐    @ActionParameter(name = "messageSubject") String messageSubject,
                                                                          ⌐ 210d
204c ⌐    @ActionParameter(name = "messageFrom") String messageFrom,
                                                                    ⌐ 210e
204d ⌐    @ActionParameter(name = "messageCC") String messageCC,
                                                                ⌐ 210f
204e ⌐    @ActionParameter(name = "messageBcc") String messageBcc) throws RxException {

Message emailMessage = new Message(messageTo, messageBody, messageSubject,
            messageFrom, messageCC, messageBcc);

this.sendEmailMessage(emailMessage);

```
package com.bmc.arsys.rx.business.common;

/**
 * The Interface for all services - framework service and
application service.
 */
public interface Service {

EXTENSIBILITY OF BUSINESS LOGIC SHARED ACROSS A BUSINESS PROCESS ORCHESTRATION ENGINE, A RULE ENGINE, AND A USER INTERFACE

CROSS-REFERENCE TO RELATED APPLICATIONS

This application claims priority under 35 U.S.C. § 119(a)-(b) to Indian Provisional Patent Application No. 4309/CHE/2015, filed on Aug. 18, 2015 with the Indian Patent Office, and entitled "EXTENSIBILITY OF BUSINESS LOGIC SHARED ACROSS A BUSINESS PROCESS ORCHESTRATION ENGINE, A RULE ENGINE, AND A USER INTERFACE", the contents of which are hereby incorporated by reference.

TECHNICAL FIELD

This description generally relates to a software platform. The software platform can support process-driven enterprise applications that can implement business processes.

BACKGROUND

The development and configuration of a process-driven enterprise application can involve coordination across multiple development areas. The process-driven enterprise application can implement business processes that can include interactions between employees, resources, and workflows. A first development area can be associated with the orchestration of the process (e.g., what activities occur during the process and in what order the activities occur). A second development area can be associated with the lifecycle of the process (e.g., state changes over time of documents and requests that are associated with the process). A third development area can be associated with one or more business rules associated with the process (e.g., constraints around one or more of the process activities). For example, the activities (the process activities) can include, but are not limited to, approvals, notifications, and assignments. In some implementations, the activities can include automated activities.

In order to achieve coordination of a process-driven enterprise application across multiple development areas, a partnership may be required between a software developer (who creates the software modules needed to fulfill the business requirements) and a business analyst (who understands the needs of the business). For example, the business analyst can provide the software developer with specifications about desired system behavior. A software developer can create the logic for the process-driven enterprise application. A business analyst can define the process functionality and behavior of the process-driven enterprise application using business rule engines, process orchestration engines, and process lifecycle engines. Each of these engines, however, may understand just a limited set of primitive application process behaviors. The software developer is left with the task of understanding completely the business use cases in order to write the code for the software modules needed to fulfill the business requirements for the process-driven enterprise application.

Thus, a need exists for systems, methods, and apparatus to address the shortfalls of present technology and to provide other new and innovative features that can allow a software developer to more easily write code for software modules needed to fulfill business requirements for process-driven enterprise applications.

SUMMARY

In one general aspect, a method for codeless visual development of an application can include creating an action, the creating including annotating a block of code with metadata, and encapsulating the annotated block of code into a reusable building block of code, publishing the action, the publishing including registering the action in a service registry, dynamically discovering the action in the service registry by an application during runtime, invoking the action by the application, and executing the action by the application, the executing performing a method specified by the action.

Implementations may include one or more of the following features. For example, a framework or application service can publish the action. The framework or application service can implement a marker interface service. The service registry can use the marker interface service to identify services on which the dynamic discovery of an action is performed. The block of code can include at least one parameter. Annotating a block of code with metadata can include marking the method as a discoverable action, and providing a name for the at least one parameter. Invoking the action by the application can include accessing an action service including an action definition associated with the action, the action definition including an action type name, an input parameters map, and an output parameters map. The application can be included in a business process orchestration engine. The application can be included in a business rule engine. The application can be included in a user interface. The application can be part of a business object lifecycle modeled using a state machine. Invoking the action by the application further can include scheduling the execution of the action based on a time rule. The application can be included in a server platform. Executing the action can include executing the action remotely from the server platform.

In another general aspect, a system can include a framework configured to publish an action, the action including a block of code annotated with metadata and encapsulated into a reusable building block of code, a marker interface service implemented by the framework, service registry configured to interface with the marker interface service to identify services on which an application can perform a dynamic discovery of an action, a service registrar configured to register the action in the service registry, an action service configured to associate an action definition with the action, and a server platform configured to execute an application that dynamically discovers the action during runtime, invokes the action, and executes the action.

Implementations may include one or more of the following features. For example, executing the action by the application can include performing a method specified by the action in the system. The application can be included in at least one of a business process orchestration engine, a business rule engine, a user interface, and a business object lifecycle modeled using a state machine. The action definition can include an action type name, an input parameters map, and an output parameters map.

In yet another general aspect, a non-transitory, machine-readable medium can have instructions stored thereon. The instructions, when executed by a processor, can cause a computing device to create an action, the creating including annotating a block of code with metadata, and encapsulating the annotated block of code into a reusable building block of code, publish the action, the publishing including registering the action in a service registry, dynamically discover the action in the service registry by an application during runtime, invoke the action by the application, and execute the action by the application, the executing performing a method specified by the action.

Implementations may include one or more of the following features. For example, a framework can publish the action. The instructions can further cause the computing device to implement, by the framework, a marker interface service. The instructions can further cause the computing device to use, by the service registry, the marker interface service to identify services on which the dynamic discovery of an action is performed. The block of code can include at least one parameter. Annotating a block of code with metadata can include marking the method as a discoverable action, and providing a name for the at least one parameter. The instructions that cause the computing device to invoke the action by the application can include instructions that cause the computing device to access an action service including an action definition associated with the action, the action definition including an action type name, an input parameters map, and an output parameters map.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

A software developer, when writing code for a process-driven enterprise application, can create reusable building blocks of code, which can be referred to as actions. Each re-useable building block of code, or action, can perform a specific function that can be used across multiple enterprise or business development areas when coordinating the development and configuration of a process-driven enterprise application. The multiple development areas can include, but are not limited to, process orchestration, process lifecycle, and business rules. The software developer can annotate useful behaviors to create the reusable blocks of code (actions) for incorporation into business applications. The software developer can annotate each action for use by a business analyst in a visual development interface. For example, a visual development interface can be a graphical user interface (GUI) on a display device included in a computing device being used by the business analyst. The software developer can make the actions automatically available to the business analyst for use in (incorporation into) business use cases in the multiple development areas (e.g., process orchestration, process lifecycle, and business rules).

The business analyst can incorporate the use of these actions into one or more business use cases in one or more of the multiple development areas. The software developer, therefore, may no longer need to understand completely the business use cases for the code that they are writing. The software developer can focus on designing and writing code and specifically, designing and writing reusable blocks of code (actions). The business analyst can focus on how to combine and incorporate the actions into business applications based on the knowledge the business analyst has about a business application, an enterprise, a business process, a business development area, and a business use case. The business analyst need not be concerned with designing and writing the code. The business analyst can achieve codeless visual development in the development areas of process orchestration, process lifecycle, and business rules.

The deployment of the actions and the configuring of a process-driven enterprise application to use the actions can be a simple process. The software developer, familiar with writing code, can create, annotate, and deploy the actions when writing the code for the process-driven enterprise application. The business analyst, familiar with the needs of the business, can configure the process-driven enterprise application to use one or more selected actions based on the business analyst's understanding of the business requirements. Separating the development of the process-driven enterprise application in this way can reduce the amount of time needed to develop the process-driven enterprise application.

For example, the actions, as re-useable building blocks, can extend the functionality of a business process orchestration engine, a business rule engine, and a user interface for the process-driven enterprise application. The business process orchestration engine can align business needs and/or business requests with a process-driven enterprise application. The business rule engine can execute business rules based on company policies and operational criteria. The business rule engine can define, test, execute, and maintain business rules separate from the process-driven enterprise application. The user interface can provide a mechanism for a business analyst to interact with a process-driven enterprise application.

A software developer can annotate a block of code with additional metadata and then encapsulate the annotated code into a reusable building block of code that can be referred to as an action. The software developer can perform this process independently of a programming language used to write the code. In addition or in the alternative, the software developer can perform this process independent of a framework that uses the action. For example, a software developer can implement the action (create the annotated reusable building block of code) using a programming language that supports dynamic discovery of the action, dynamic loading of the action at run time, and tagging of an action.

An action can include code for reusable business logic that can be used by different use cases. For example, an action can include code for reusable business logic that can be used from backend (business process or rule) use cases or from frontend (user interface) use cases. An activity in a business process can invoke an action. A business object lifecycle process modeled using a state machine can invoke an action. A business rule engine can invoke an action. A user action in a user interface can invoke an action. For example, an action can include reusable business logic for processing an incoming email message. For example, an action can include reusable business logic for processing an incoming event from an event manager. In some implementations, processes can remotely execute an action. In some implementations, a process can schedule execution of an action based on time-based rules. In some implementations, a process can directly execute an action by way of in-process calls from arbitrary code included in the process-driven enterprise application.

In some implementations, one or more of a business process orchestration engine, a business rule engine, and a user interface for a process-driven enterprise application can be embedded into a server platform. In some implementations, one or more of a business process orchestration engine, a business rule engine, and a user interface for a process-driven enterprise application can be executed as an external process by a server platform. Reusable business logic (actions) can provide the same dynamically extendable functionality across a business process orchestration engine, a business rule engine, and a user interface.

In some implementations, the dynamic extendable functionality of reusable business logic (actions) can be provided across different environments in which a server platform can execute application programs. The different environments can exist within an enterprise or business. For example, a server platform may execute application programs in a development environment, in a quality assurance (QA) environment, and in a production environment. In cases where a server platform upgrade (update) occurs, the dynamic extendable functionality of the actions can be preserved.

In some implementations, a server platform vendor can define reusable business logic (e.g., platform actions) associated with a server platform. In some implementations, customers can define reusable business logic (e.g., custom actions) associated with the server platform. A software developer can create the platform actions and the custom actions using the same framework. In addition, the platform actions and the custom actions can co-exist in the server platform.

A process-driven enterprise application can dynamically discover actions registered on the server platform at runtime. For example, when created, a framework or an application service can publish an action for registration in a service registry included in the server platform. A framework or application service that publishes an action can implement a marker interface service. The service registry uses the marker interface service to identify services on which the dynamic discovery of actions can be performed. An action type can represent a registered action that can be discoverable at runtime by the process-driven enterprise application. At runtime, the process-driven enterprise application can use an action service to invoke a registered action.

Figure 1:
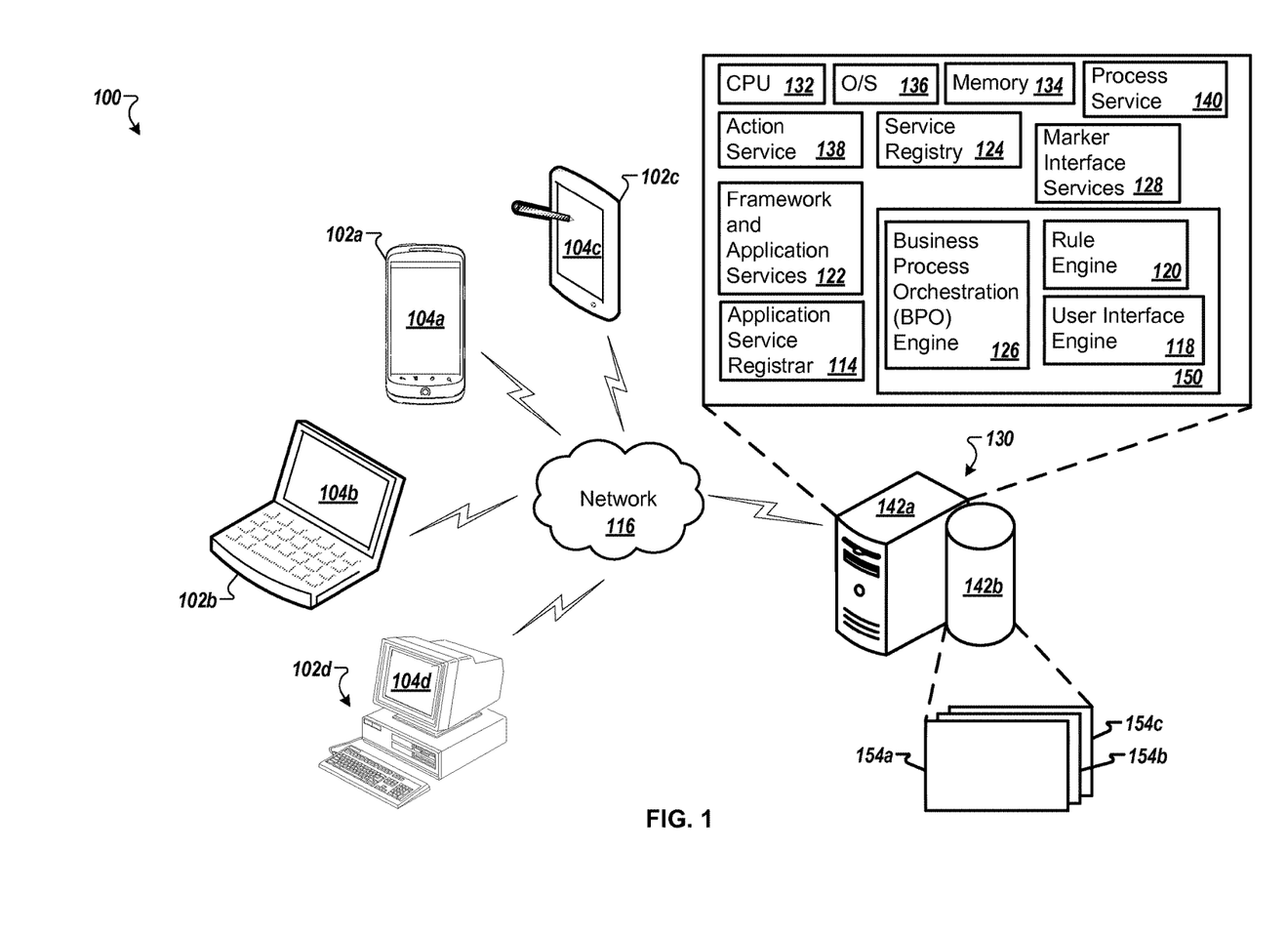
FIG. 1 is a diagram of an example system for creating and utilizing reusable building blocks of code that can be referred to as actions.

FIG. 1 is a diagram of an example system 100 for creating and utilizing reusable building blocks of code that can be referred to as actions. The system 100 includes a computer system 130 and computing devices 102a-d. A user can connect to or otherwise interface with the computer system 130 by way of a network 116 using one or more of the computing devices 102a-d. For example, a computing device 102a can be a mobile phone, a smartphone, a personal digital assistant, or other type of mobile computing device. The computing device 102a includes a display device 104a. For example, a computing device 102b can be a laptop or notebook computer. The computing device 102b includes a display device 104b. For example, a computing device 102c can be a tablet computer. The computing device 102c includes a display device 104c. For example, a computing device 102d can be a desktop computer. The computing device 102d includes a display device 104d.

For example, a user of the computing devices 102a-d can be a business analyst. The business analyst can use/interface with a visual development interface displayed on a display device included in a computing device (e.g., the display devices 104a-d included in the computing devices 102a-d, respectively). The visual development interface can include one or more actions that the business analyst can select for use in (for incorporation into) business use cases in multiple development areas (e.g., process orchestration, process lifecycle, and business rules).

In some implementations, the network 116 can be a public communications network (e.g., the Internet, cellular data network, dialup modems over a telephone network) or a private communications network (e.g., private LAN, leased lines). In some implementations, the computing devices 102a-d can communicate with the network 116 using one or more high-speed wired and/or wireless communications protocols (e.g., 802.11 variations, WiFi, Bluetooth, Transmission Control Protocol/Internet Protocol (TCP/IP), Ethernet, IEEE 802.3, etc.).

The computer system 130 can include one or more computing devices (e.g., a server 142a) and one or more computer-readable storage devices (e.g., a database or repository 142b). The server 142a can include one or more processors (e.g., server CPU 132), and one or more memory devices (e.g., server memory 134). The computing devices 102a-d can communicate with the computer system 130 (and the computer system 130 can communicate with the computing devices 102a-d) using the network 116. In some implementations, the computer system 130 can represent multiple computing devices (e.g., servers) and multiple computer-readable storage devices (e.g., databases or repositories) working together to perform server-side operations.

The server 142a can execute a server O/S 136. The server 142a can execute one or more applications. The server 142a can include an application service registrar 114, a process service 140, an action service 138, framework and application services 122, a business process orchestration (BPO) engine 126, marker interface services 128, a user interface engine 118, and a rule engine 120. In the example implementation shown in FIG. 1, the BPO engine 126, the rule engine 120, and the user interface engine 118 can be included in (embedded in) a server platform 150 included in the server 142a. In some implementations, the BPO engine 126, the rule engine 120, and the user interface engine 118 may be executed as processes external to the server platform 150. In these cases, the BPO engine 126, the rule engine 120, and the user interface engine 118 may be included in the server 142a or in one or more other servers that can be included in the computer system 130 and that can work together with the server 142a to perform server-side operations.

For examples, the BPO engine 126, the rule engine 120, and the user interface engine 118 can use actions as generic building blocks to dynamically extend the functionality of the BPO engine 126, the rule engine 120, and the user interface engine 118, respectively, allowing the same extension to be provided across the BPO engine 126, the rule engine 120, and the user interface engine 118. In some implementations, the actions, in the form of generic reusable business logic, can be stored in the repository 142b and can be executed by the server 142a. In some implementations, the actions may be included a repository and executed by a server different from the server 142a and the repository 142b, where the repository and the server can work together with the server 142a but are remote from the server 142a and the repository 142b.

Each framework and application service included in the framework and application services 122 that publishes an action can implement a respective marker interface service that can be included in the marker interface services 128. The service registry 124 can use a marker interface service to identify (register) services on which the framework and application services 122 can perform action discovery. The action service 138 can provide a service for use by the framework and application services 122 for invoking a registered action, for passing input parameters to the registered action, and for receiving output parameters from the registered action.

The application service registrar 114 can implement the registration of actions that can be dynamically discovered. For example, the application service registrar 114 can be a singleton class that can coordinate the registration of the actions across the server platform. For each discovered service, the application service registrar 114 can use reflection to discover all the methods annotated with a specific annotation. The application service registrar 114 can create a corresponding object of the type of annotation in the service registry 124. The single object can be used in different use cases and by different applications executing in the server platform 150.

Applications executing in one or more of the BPO engine 126, the rule engine 120, and the user interface engine 118 included in the server platform 150 can dynamically discover and load one or more selected registered actions. The process service 140 can be a service façade that can provide an interface to the server platform 150 for invoking a selected registered action. For example, a service façade can encapsulate and expose an interface or application programming interface (API) to the registered actions to the application. A service façade can hide (not expose) the complexity of the actions (the code included in the blocks of code that form the actions). The use of a service facade decouples the application from the actions. The use of a service facade allows applications and actions to be updated and/or changed independent of one another. For example, an update or modification to a registered action does not necessitate modifying an application that accesses or uses the registered action.

The action service 138 can invoke the selected registered action by interacting with the application service registrar 114. In some implementations, the use of actions by the BPO engine 126 and the rule engine 120 can be considered backend use cases and the use of actions by the user interface engine 118 can be considered a frontend use case.

A software developer can create reusable blocks of code (e.g., actions 154a-c) for incorporation into business applications. The three actions 154a-c are shown for the example in FIG. 1. A software developer, however, can create more than three actions (e.g., twenty actions, one hundred actions) or less than three actions (e.g., two actions or one action). The actions 154a-c can be included in (stored in) the repository 142b for use by the server 142a, and in particular, for use by the server platform 150. The actions 154a-c can include reusable blocks of code that implement behaviors considered useful by a business analyst. The actions 154a-c can be annotated so that a business analyst can identify and/or select one or more of the actions 154a-c for use in one or more business applications. The business analyst can select the behaviors characterized by the corresponding actions 154a-c using a visual development interface provided by the user interface engine 118 on a display of a display device (e.g., display device 104b) included in a computing device (e.g., the computing device 102b).

The server 142a can execute application programs in multiple different enterprise environments such as a development environment, a quality assurance (QA) environment, and a production environment. In some implementations, when an upgrade (update) of the server platform 150 occurs, the dynamic extendable functionality of the actions 154a-c is preserved because the actions 154a-c may remain unchanged while one or more of the components of the server platform 150 may be upgraded. For example, the rule engine 120 can be upgraded while the actions 154a-c can remain unchanged. In some implementations, one or more of the actions 154a-c may be updated or modified while maintaining (preserving) the dynamic extendable functionality of the actions 154a-c. In these implementations, the updating or modifying of the actions 154a-c can occur independent of any upgrades (updates) that may be made to the server platform 150. For example, one or more of the actions 154a-c may be updated or modified without any upgrades or updates being made to the server platform 150.

In some implementations, a server platform vendor (e.g., an enterprise or business) can define reusable business logic (e.g., platform actions) associated with a server platform (e.g., the server platform 150). In some implementations, customers can define reusable business logic (e.g., custom actions) associated with the server platform (e.g., the server platform 150). A software developer can create the platform actions and the custom actions for use in the same framework. In addition, the platform actions and the custom actions can co-exist in the server platform (e.g., server platform 150). For example, the actions 154a-c can include platform actions and/or custom actions.

A software developer can use the framework and application services 122 to publish an action for registration in the service registry 124. The framework and application services 122 can implement a marker interface service for inclusion in the marker interface services 128. The service registry 124 can use marker interface services 128 to identify which services registered in the service registry 124 can be dynamically discovered as actions for use by the server platform 150. For example, an action (e.g., action 154a) can be registered as a particular type of action (an action type) in the service registry 124. The action type can identify the registered action as a service that can be discoverable by the server platform 150 at runtime of the server platform 150 (e.g., at runtime of an application executing on the BPO engine 126, the rule engine 120, or the user interface engine 118).

The application (e.g., a process-driven enterprise application) can use the action service 138 to invoke and interface with the discovered registered action. The action service 138 can include action definitions and input/output mappings for each action registered in the service registry 124. The action service 138 can provide a service for use by the framework and application services 122 for invoking a registered action (e.g., for passing input parameters to the registered action, and for receiving output parameters from the registered action).

An action can include code for reusable business logic that can be used by different business use cases. An activity in a business process can invoke an action. A business object lifecycle process modeled using a state machine can invoke an action. For example, the BPO engine 126 can implement the business process and the business object lifecycle process. A business rule can invoke an action. For example, the rule engine 120 can implement the business rule. A user action in a user interface can invoke an action. For example, the user interface engine 118 can implement the user interface.

For example, an action can include reusable business logic for processing an incoming email message, and/or for processing an incoming event from an event manager. In some implementations, an action can be executed remotely on a computer system (or server) remote from the server that includes the server platform. The remote computer system (or server) can register the remote actions with the server that includes the server platform. Once registered, the remote actions can be used by the server platform 150 in the same or similar way as actions 154a-c.

The remote actions can be written using any programming language. In some implementations, the remote computer system can be implemented using the same computer platform (e.g., similar or the same hardware, the same operating system) as the server platform. In some implementations, the remote computer system can be implemented using a different computer platform (e.g., different hardware, a different operating system) than the server platform. For example, the use of remote actions by a server platform can be implemented using a JavaScript Object Notation (JSON)/Hypertext Transfer Protocol (HTTP) protocol. In another example, the use of remote actions by a server platform can be implemented using Extensible Markup Language (XML) over sockets.

In these implementations, the remote actions can include custom actions. In some cases, the custom actions may be considered untrusted code. Remote execution of the remote actions allows for the protection of the server platform (and the server or computing system that includes the server) from any malicious code that could be include as part of the custom action. In some implementations, the remote actions can be stored in a repository that is remote from a server that includes the server platform 150.

In some implementations, a process can schedule execution of an action based on time-based rules. In some implementations, a process can directly execute an action by way of in-process calls from arbitrary code included in the process-driven enterprise application.

Figure 2:
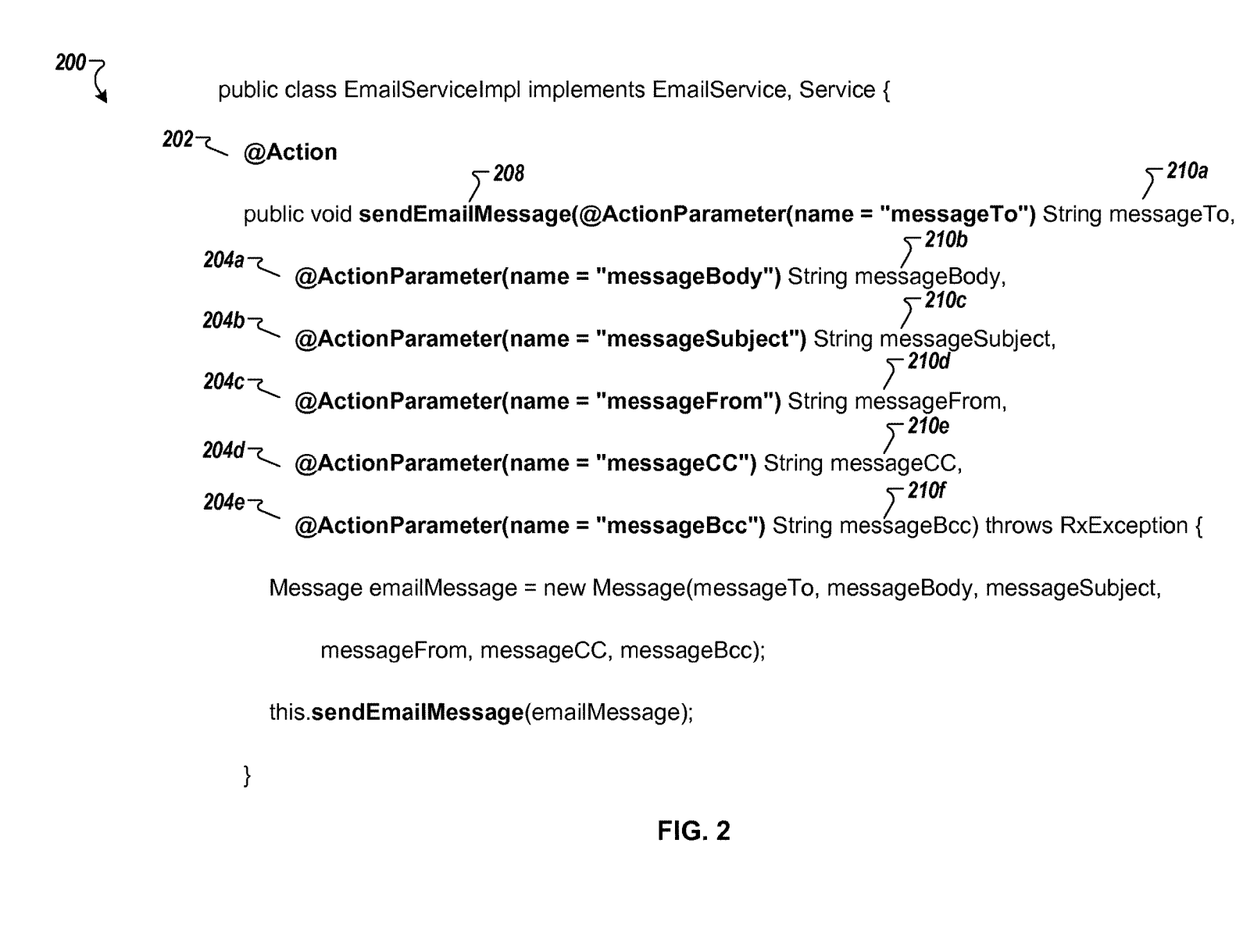
FIG. 2 is an example of an action for sending an email.

FIG. 2 is an example of an action 200 (code for reusable business logic) for sending an email. A business process can use the action 200 in different business use cases. A server platform (e.g., the server platform 150 in FIG. 1) can include the action 200. For example, the action 200 can be included in (stored in) the repository 142b. The action 200 can be referred to as a send email message action.

A first annotation 202 (e.g., @Action) and second annotations 204a-e (e.g., @ActionParameter) are introduced into a block of code (e.g., code for sending an email) when creating the action 200. The first annotation 202 marks the block of code as an action (e.g., the action 200). Each of the second annotations 204a-e mark action parameter names 206a-e, respectively, for action parameters for display in a visual development interface when creating (designing) the action.

In some implementations, the action 200 can be made available to a user (e.g., an individual associated with a server platform vendor) who can define the reusable business logic as a platform action. In some implementations, the action 200 can be made available to a user (e.g., a customer of the server platform vendor) who can define the reusable business logic as a custom action. For example, referring to FIG. 1, the visual development interface can be a GUI on a display device (e.g., the display device 104b) included in a computing device (e.g., the computing device 102b) used by the user. The visual development interface can be for one or more of a business process modeler provided by the BPO engine 126, a rule builder provided by the rule engine 120, a user interface builder provided by the user interface engine 118, or other user interface that the user can use (interface with) to create (design) an action.

Referring to FIG. 1, a software developer can use the framework and application services 122 to publish the action 200 for registration in the service registry 124. The service registry 124 can use the marker interface services 128 to identify the action 200 as an action type 208 (e.g., sendEmailMessage) that can be discoverable at runtime of a process-driven enterprise application. The process-driven enterprise application can interface with the framework and application services 122 to dynamically discover and load the action 200 using the action service 138 to invoke the action 200. The framework and application services 122 can pass input parameters to the registered action, and can receive output parameters from the registered action.

In the example action 200, the action type 208 can be a new action type that is dynamically registered in the service registry 124. The action type 208 includes six arguments 210a-f. For example, a messageTo argument 210a is the "To" email address or a comma separated list of "To" email addresses. A messageBody argument 210b represents the body of an email message to be sent. A messageSubject argument 210c represents a subject of an email message. A messageFrom argument 210d is an email address of the sender. A messageCC argument 210e is the cc email address or a comma separated list of cc email addresses. A messageBcc argument 210f is the bcc email address or a comma separated list of bcc email addresses.

The action 200 can accept parameters that represent different elements of an email message. In some implementations, the action 200 can provide a connection that uses a Simple Mail Transfer Protocol (SMTP) to connect to a pre-defined email server that can send the email. For example, an activity in a business process executing in the BPO engine 126 can invoke the action 200 to send an email. For example, a rule included in the rule engine can stipulate that an email be sent based on satisfying a condition. For example, a user action in a user interface provided by the user interface engine 118 can initiate the sending of an email (e.g., a user selecting and clicking on a button included in a HyperText Markup Language (HTML) document or web page.

As shown in FIGS. 1 and 2, the action 200 can be a reusable block of code that can be invoked by applications executing on one or more engines (e.g., the BPO engine 126, the rule engine 120, and the user interface engine 118) included in the server platform 150.

Figure 3:
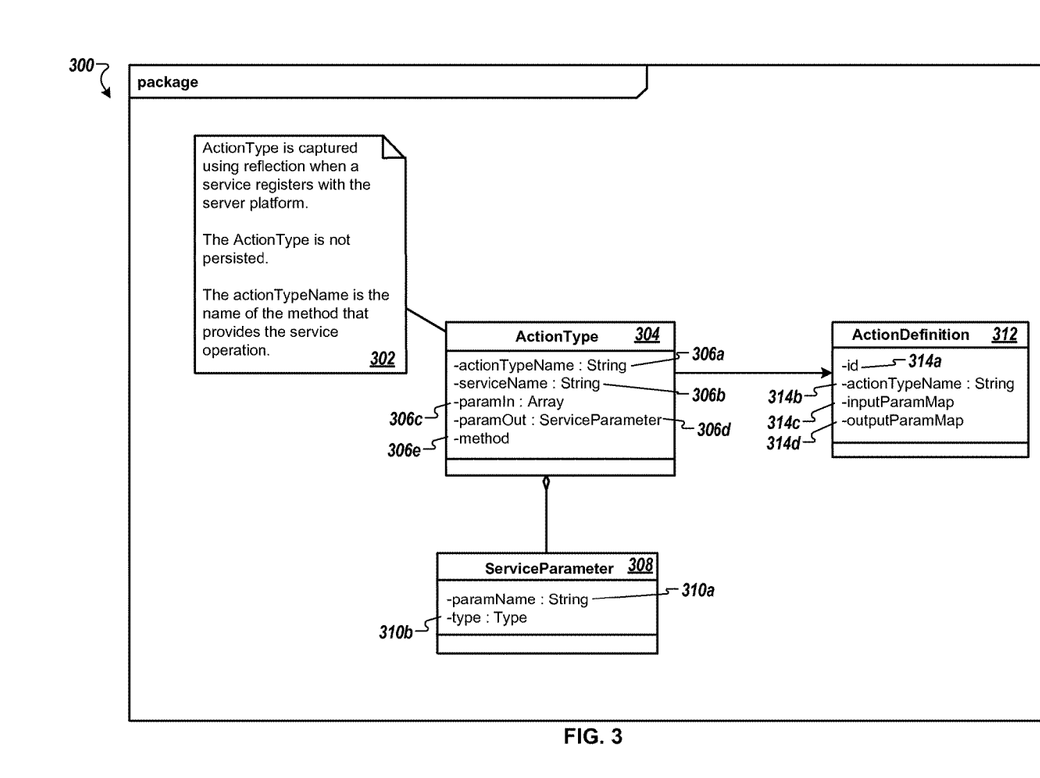
FIG. 3 is a block diagram of a software package for an example domain object for an action.

FIG. 3 is a block diagram of a software package for an example domain object 300 for an action. For example, a domain object can be implemented as an object model within a software layer of an enterprise application. The software layer that includes the object model can use a lower-level layer of the software for persistence. The domain object can publish an application programming interface (API) to a higher-level software layer in order to allow functions included in the higher-level software layer to gain access to the data and behavior of the domain object.

As described with reference to FIGS. 1 and 2, the framework and application services 122 can publish an action.

The domain object 300 includes variable definitions 302. An ActionType 304 (e.g., an action type) for an action can be captured using reflection when a service registers the action with the server platform. For example, FIG. 2 shows an example action type 208 (e.g., sendEmailMessage). The framework and application services 122 can publish the action 200 of the action type 208 for registration in the service registry 124, registering the action 200 with the server platform 150. The ActionType 304 may not be persisted. An action type can represent a registered action that can be discoverable at runtime by the enterprise application. The service registry 124 can provide API management services for the server platform 150.

The ActionType 304 can include attributes 306a-e. An actionTypeName attribute 306a can be a name of a method or process that can provide a service operation to the server platform 150. The actionTypeName attribute 306a represents a name for the action. For example, the actionType-Name attribute 306a can be the name of a method that can provide the action. Referring to FIG. 2, the actionTypeName can be "sendEmailMessage", a name for the action of sending an email message.

A serviceName attribute 306b can represent a name of a service that implements an action. For example, referring to FIG. 2, "EmailServiceImpl" can be a name of a service that implements the "EmailService" action marked by the first annotation 202.

A paramIn attribute 306c can represent a list of input parameters for an action. A ServiceParameter 308 can be used to represent each input parameter. The ServiceParameter 308 can be used to represent metadata for each input parameter of an action. For example, referring to FIG. 2, the second annotations 204a-e mark a list of input parameters for the action 200. The second annotation 204a marks a paramIn attribute represented by the ServiceParameter shown as argument 210a ("String Message To"). A paramOut attribute 306d can represent a return value type for an action. The ServiceParameter 308 can be used to represent each output parameter. The ServiceParameter 308 can be used to represent metadata for each output parameter of the action.

A method attribute 306e can be a handle to a method object that can be invoked by a service. For example, the method object can be a "javalang.reflect.Method" in implementations where Java programming language is used to implement the actions. In these implementations, the Java programming language can leverage the use of the Open Source Gateway initiative (OSGi) technology in the framework that incorporates the action.

The ServiceParameter 308 includes attributes 310a-b. A paramName attribute 310a can represent a name for the parameter. A type attribute 310b can represent a parameter type. In implementations where Java programming language is used to implement the actions, the parameter type can be "java.lang.reflect.Type." For example, referring to FIG. 2, the argument 210b is represented by a ServiceParameter 308 where the name for the parameter (e.g., the paramName attribute 310a) is "String" and the parameter type (e.g., type attribute 310b) is "messageBody."

An ActionDefinition 312 can represent a particular configuration for invoking an action. For example, in order for an application to invoke an action, an ActionDefinition 312 associated with the action needs to be specified by the framework and application services 122. The ActionDefinition 312 includes attributes 314a-d. An id attribute 314a represents an identifier for the ActionDefinition 312. An actionTypeName attribute 314b represents an action name. The action name is the name of the action whose configuration is specified by the ActionDefinition 312. An inputParamMap attribute 314c represents the input parameter map of expressions that can be passed to the action. An outputParamMap attribute 314d represents an output parameter expression for the action.

Figure 4:
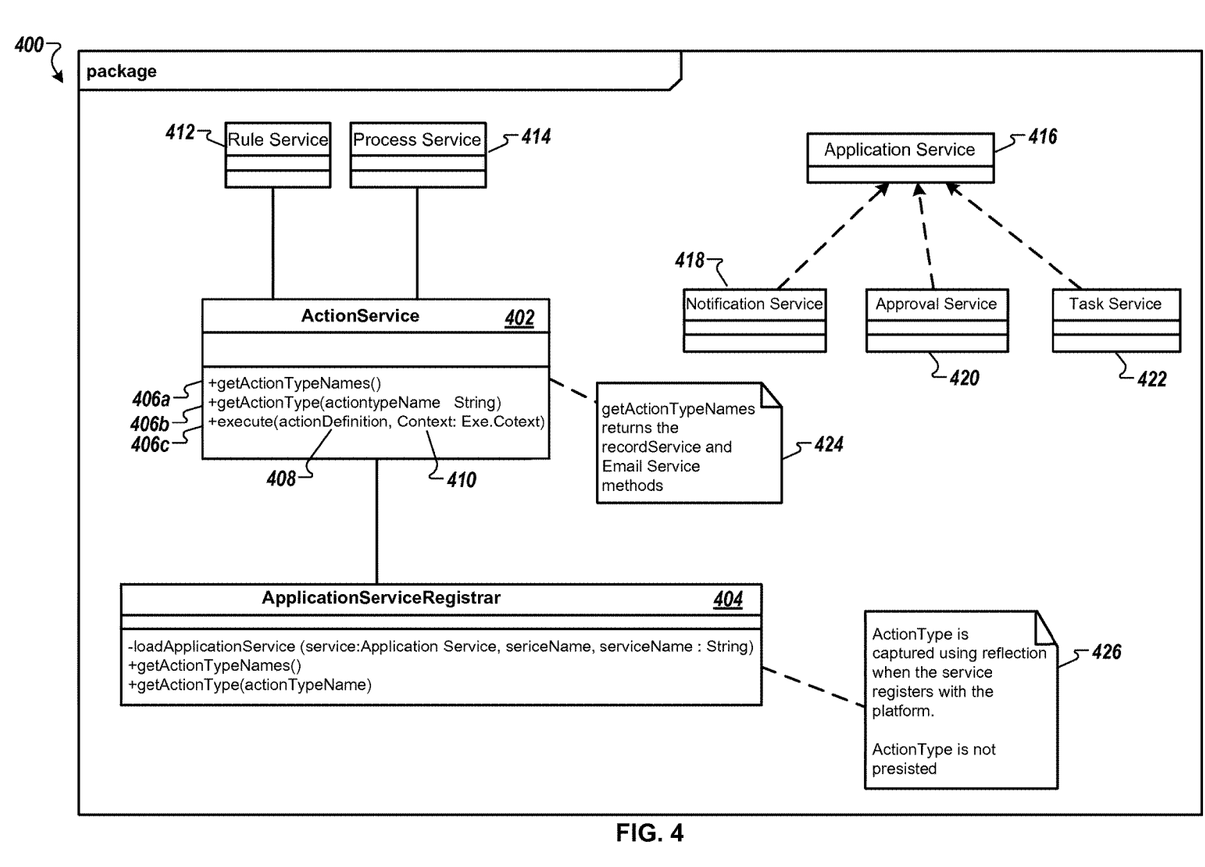
FIG. 4 is a block diagram of an example runtime support system that provides a service to a server platform for invoking a registered action.

FIG. 4 is a block diagram of an example runtime support system 400 that provides a service to a server platform for invoking a registered action. The runtime support system 400 can include an action service 402. For example, referring to FIG. 1, the action service 402 can be the action service 138.

The action service 402 can provide a runtime support interface and service for use by a framework and application service (e.g., the framework and application services 122) for invoking a registered action, for passing input parameters to the registered action, and for receiving output parameters from the registered action. For example, applications executing in one or more of the BPO engine 126, the rule engine 120, and the user interface engine 118 can dynamically discover and load one or more selected registered actions. A process service 414 can be a façade service that can provide an interface to the applications executing in the BPO engine 126, the rule engine 120, and the user interface engine 118 for invoking a selected registered action. The action service 138 can then invoke the selected registered action by interacting with an application service registrar 404.

As described with reference to FIG. 1, framework and application services 122 that published an action can implement a marker interface service for inclusion in the marker interface services 128. The service registry 124 can use a marker interface service to identify (register) services on which the framework and application services 122 can perform action discovery.

Figure 5:
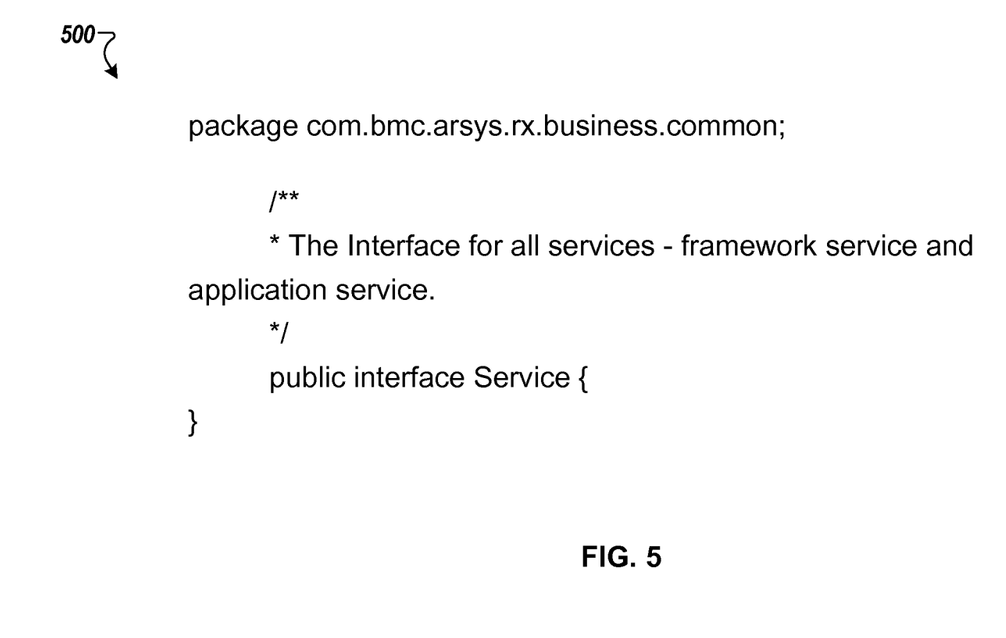
FIG. 5 shows example source code for a marker interface service.

FIG. 5 shows example source code 500 for a marker interface service. For example, the marker interface service can be included in the marker interface services 128.

Referring again to FIGS. 1 and 4, the service registry 124 can include a registry of actions that an application can discover. In implementations that use Java programming language to implement actions, a service registry can be an OSGi service registry that allows for (provides) dynamic registration of OSGi services for use by an application. The service registry can be implemented using an OSGi service tracker. An OSGi service tracker can allow for the discovery of services being added, modified, or removed from a service registry (e.g., the service registry 125 as shown in FIG. 1) or OSGi container. The OSGi service tracker can allow this discovery based on the use of a specified filter condition applied to the services in the service registry. The specified filter condition discovers (identifies) framework and application services that implement a marker interface service included in the marker interface services 128.

The application service registrar 404 can be part of the runtime support system 400. The application service registrar 404 can implement registration for dynamically discoverable actions. For example, the application service registrar 404 can be implemented as a singleton class. For each discovered service, the application service registrar 404 can discover all the methods annotated with a specific annotation (e.g., an "@Action" annotation) using Java reflection. The application service registrar 404 can create a corresponding object of the type of annotation (e.g., an ActionType named object) in a service registry (e.g., the service registry 124).

For example, an action type can be captured using reflection when a service registers with a server platform, and action type is not persisted (text document 426).

The action service 402 can provide a service for invoking a registered action, for passing input parameters to the registered action, and for receiving output parameters from the registered action. The action service 402 can be implemented as a singleton class. The action service 402 can provide methods 406a-c. A getActionTypeNames method 406a can use the application service registrar 404 to obtain a list of all registered actions represented by an ActionType name. For example, the getActionTypeNames method 406a can return a record service method and an email service method (text document 424). Referring to FIG. 2, an example of an email service method is shown as the example action 200 for sending an email.

A getActionType method 406b can use the application service registrar 404 to obtain a specific type of action for a specified ActionType name. An execute method 406c can allow the execution of an action using a specified action definition 408 and a specified execution context 410. The execution context 410 can provide runtime context related information for executing the action.

The execute method 406c can be called in different use case scenarios. For example, invocation of an action from an activity in a business process can result in the calling of the execute method 406c. For example, invocation of an action from a rule when a certain condition is satisfied can result in the calling of the execute method 406c. For example, invocation of an action from a user interaction with a user interface can result in the calling of the execute method 406c. The execute method 406c can invoke a specified action irrespective of the use case scenario in which the execute method 406c is used.

The runtime support system 400 can include a rule service 412 that can interact with and interface to the action service 402. The runtime support system 400 can include an application service 416. A notification service 418, an approval service 420, and a task service 422 can interface to the application service 416.

Figure 6:
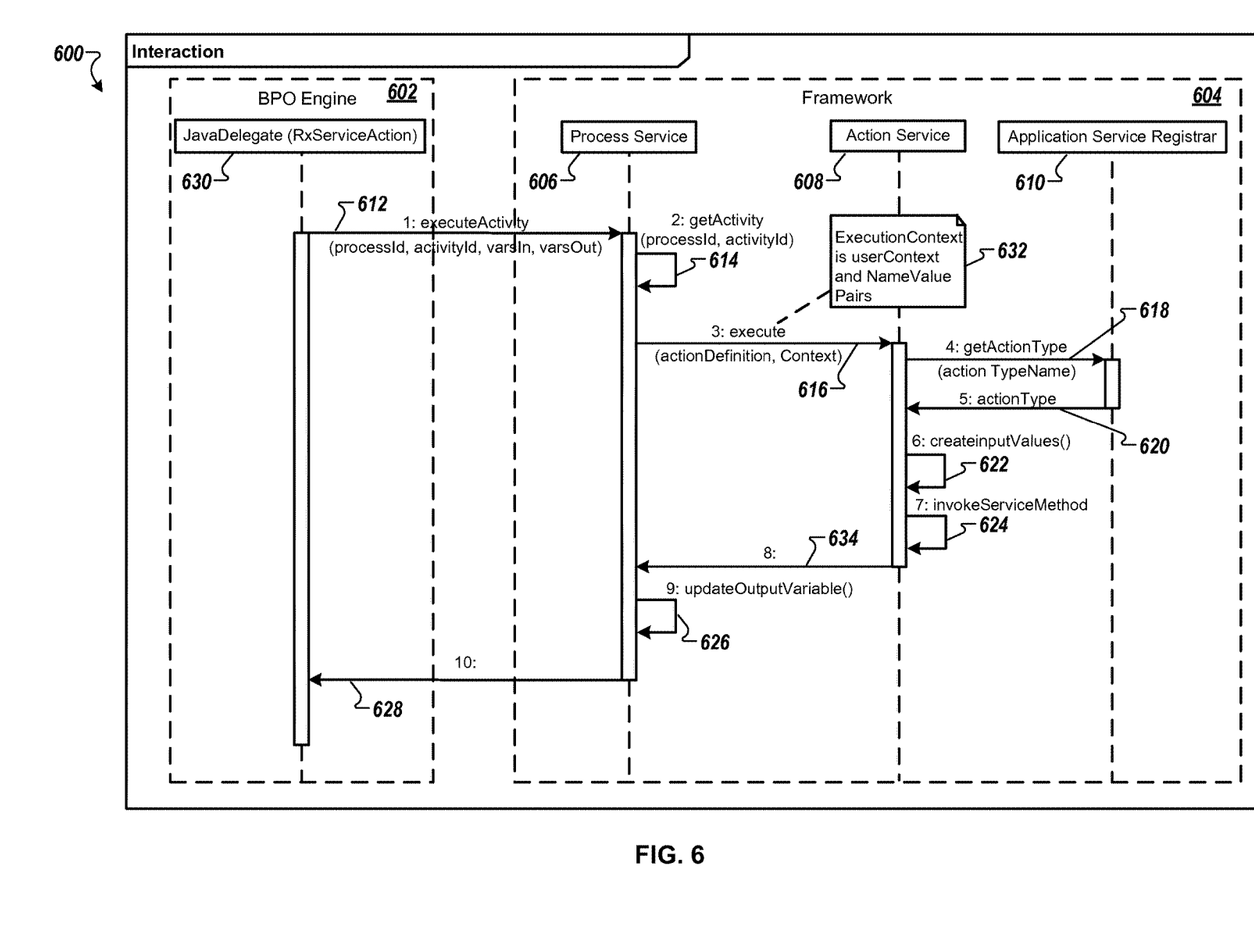
FIG. 6 is a diagram of an example sequence flow for using an action.

FIG. 6 is a diagram of an example sequence flow for a process 600 for using (invoking) a registered action. The process 600 shows an interaction between a BPO engine 602 and a framework 604. For example, referring to FIG. 1, the BPO engine 602 can be the BPO engine 126. The framework 604 can include a process service 606, an action service 608, and an application service registrar 610. For example, the process service 606 can be the process service 140, action service 608 can be the action service 138, and the application service registrar 610 can be the application service registrar 114.

The process 600 begins with a delegate 630 (e.g., a Java delegate) included in the BPO engine 602 delegating the invocation of an action to the process service 606 (arrow 612). The process service 606 can be a façade service that can provide an interface between a server platform (and in this example the BPO engine 602) and the action service 608. For example, the process service 606 implemented as a façade service acts as an interface between the BPO engine 602 and the action service 608, delegating the task or work of invoking an action to the action service 608. The invocation of the action provided by the BPO engine 602 includes the specifying of a process identification (ID) and an activity ID. The action invocation can also include one or more process variables (e.g., input process variables and output process variables).

The process service 606 can look up a definition of the action (an action definition) based on the process ID and the activity ID (arrow 614). The process service 606 can create an execution context and invoke an execute method in the action service 608 (arrow 616). The execution content can include a user context and name value pairs (text document 632).

The execute method can look up the action type based on an action type name specified by the action definition. The action services can use the application service registrar 610 to perform the action type look up (arrow 618). The application service registrar 610 returns (provides) the action type to the action service (arrow 620). The action service 608 can ensure that a number of arguments included in the action definition match a number of arguments specified by the action type. The action service 608 can evaluate expressions specified in an input parameters map included in the action definition. The action service 608 can prepare a list of inputs to pass to the action based on the evaluation of the expressions (arrow 622). The action service 608 can invoke the action or service method (e.g., using Java reflection) (arrow 624). The action service 608 can pass to the action the list of prepared inputs. The action service 608 can receive a return value from the action based on the invocation of the action. The action service 608 can evaluate expressions specified in an output parameters map included in the action definition.

The action service 608 can update an output map included in the execution context based on the evaluation of the expressions (arrow 626). The action service provides the updated output map to the process service (arrow 634). The process service 606 can return (provide) the updated output variables included in the output map included in the execution context to the BPO engine 602 (arrow 628). Process variables included in the BPO engine 602 can be updated.

Referring to FIGS. 2 and 6, the invoked action can be the send email message registered action as shown in FIG. 2. In some implementations, a "send email" activity in the BPO engine 602 can invoke the send email message registered action, passing the action any required input parameters. For example, the send email message action can then send an email by connecting to a pre-configured email server using a SMTP.

In some implementations, a business object lifecycle modeled using a state machine can invoke the send email message action for sending out an email based on a certain condition being satisfied. In some implementations, when a certain condition is satisfied, a rule can be specified that can invoke the send email message action. In some implementations, a representational state transfer (REST) API call can invoke the send email message action based on receiving input from a user interface indicative of a user clicking a button included in the user interface.

Figure 7:
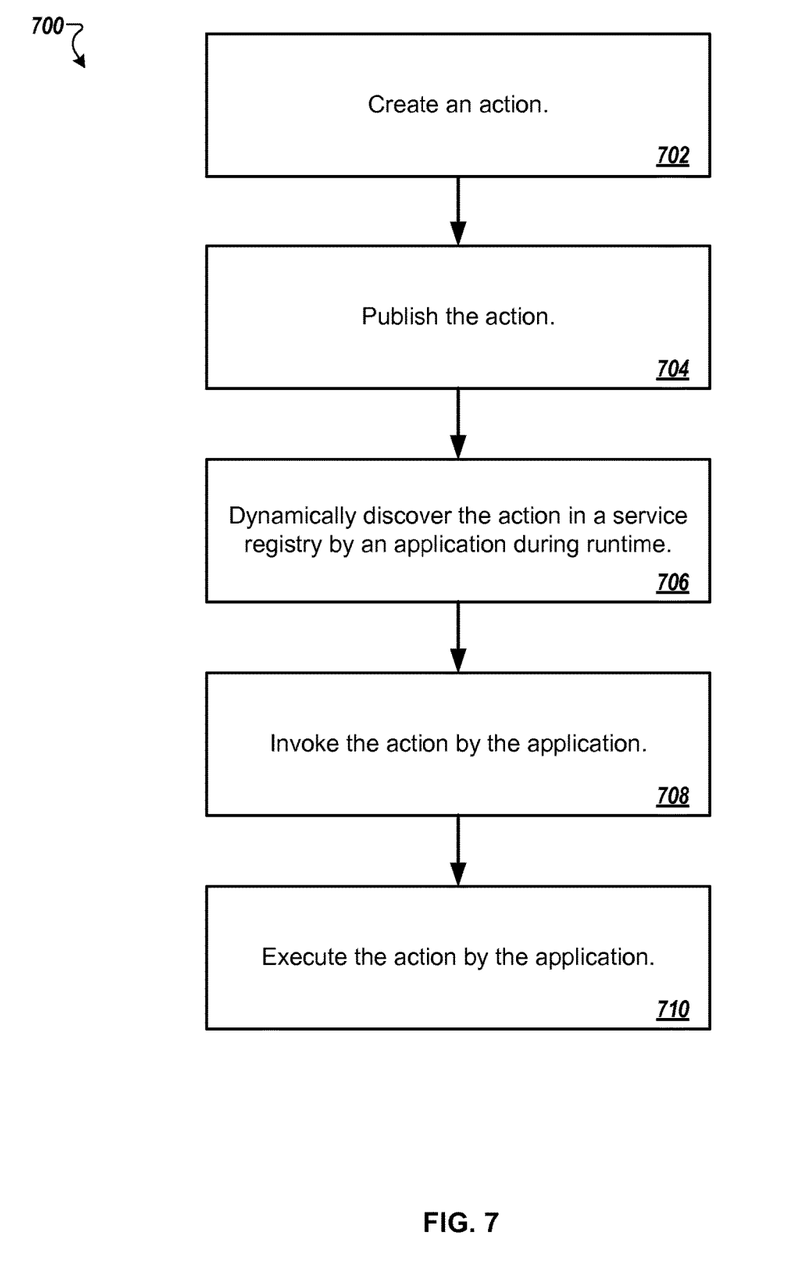
FIG. 7 is a flowchart that illustrates a method for invoking an action.

FIG. 7 is a flowchart that illustrates a method 700 for invoking an action. In some implementations, the computing devices and systems described herein can implement the method 700. For example, the method 700 can be described referring to FIGS. 1-6.

An action can be created (block 702). Creating the action can include annotating a block of code with metadata and encapsulating the annotated block of code into a reusable building block of code. For example, the system 100 in FIG. 1 can be used to create the action. The action is published (block 704). Publishing the action can include registering the action in a service registry. For example, as described with reference to FIG. 1, a framework or an application service included in the framework and application services 122 can publish the action for registration in the service registry 124. The action can be dynamically discovered in the service registry by an application during runtime (block 706). The application can invoke the action (block 708). The application can execute the action (block 710). Executing the action can perform a method specified by the action.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium, a non-transitory computer-readable storage medium, a tangible computer-readable storage medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method for codeless development of an application executing on a server platform in one or more of a business process orchestration (BPO) engine, a rule engine, or a user interface engine, the method comprising:
creating one or more actions, each action coded in a reusable block of code, each action having an action definition including an action type name, an input parameters map, and an output parameters map;
providing an application service registrar to register each action in a registry, each action registered in the registry being dynamically discoverable;
providing a process service coupled to the registry, the process service providing an interface between the application in development and an action service, the process service decoupling the application in development from the one or more actions and allowing the application in development and the one or more actions to be updated and/or changed independent of one another; and
invoking, by the application in development, one of the actions registered in the registry, the invoking occurring by:
delegating the invoking of the action to the process service, the process service looking up the definition of the invoked action based on a process identification (ID) and an activity ID specified by the application, the process service creating an execution context and calling an execute method in the action service;

the action service discovering the invoked action using the application service registrar to perform an action type name look up in the registry, the action service ensuring that a number of arguments included in the action definition matches a number of arguments specified by the action type; and the action service passing an input to and receiving a return value from the invoked action, updating the output parameters map included in the definition of the invoked action, and returning the updated output parameters map to the application in development for updating processing variables in the application in development.

2. The method of claim 1, wherein the action is published by the application service.

3. The method of claim 2,
wherein the application service implements a marker interface service, and
wherein the registry uses the marker interface service to identify services on which dynamic discovery of an action is performed.

4. The method of claim 1,
wherein the block of code includes at least one input parameter or output parameter.

5. The method of claim 1, wherein invoking the action by the application includes:
accessing the action service including the action definition associated with the action.

6. The method of claim 1, wherein the application in development is included in a business process orchestration engine.

7. The method of claim 1, wherein the application in development is included in a business rule engine.

8. The method of claim 1, wherein the application in development is included in a visual development interface.

9. The method of claim 1, wherein the application in development is part of a business object lifecycle modeled using a state machine.

10. The method of claim 1, wherein invoking the action by the application in development further includes scheduling execution of the action based on a time rule.

11. The method of claim 1, wherein the application in development is included in the server platform, and wherein executing the action includes executing the action remotely from the server platform.

12. A system comprising: a server platform including one or more processors for codeless development of an application executing on a server platform in one or more of a business process orchestration (BPO) engine, a rule engine, or a user interface engine;
one or more actions, each action coded in a reusable block of code, each action having an action definition including an action type name, an input parameters map, and an output parameters map, each action being registered in a registry by an application service registrar, each action registered in the registry being dynamically discoverable; and
a process service coupled to the registry, the process service providing an interface between the application in development and an action service, the process service decoupling the application in development from the one or more actions and allowing the application in development and the one or more actions to be updated and/or changed independent of one another,
wherein the process service is configured to receive a process ID and an activity ID specified by the application in development to invoke an action registered in the registry, look up the definition of the invoked action based on the process ID and activity ID specified by the application in development, create an execution context, and call an execute method in the action service,
wherein the action service is configured to discover the invoked action using the application service registrar to perform an action type name look up in the registry, the action service ensuring that a number of arguments included in the action definition matches a number of arguments specified by the action type, and
wherein the action service is further configured to pass an input to and receive a return value from the invoked action, update the output parameters map included in the definition of the invoked action and return the updated output parameters map to the application in development for updating processing variables in the application in development.

13. The system of claim 12, wherein invoking the action by the application in development includes performing a method specified by the action.

14. The system of claim 12, wherein the application in development is included in at least one of a business process orchestration engine, a business rule engine, a visual development interface, or a business object lifecycle modeled using a state machine.

15. A non-transitory, machine-readable medium having instructions stored thereon, the instructions, when executed by a processor, cause a computing device to:
create one or more actions, each action coded in a reusable block of code, each action having an action definition including an action type name, an input parameters map, and an output parameters map;
use an application service registrar to register each action in a registry on a server platform, each action registered in the registry being dynamically discoverable;
couple a process service to the registry, the process service providing an interface between an application in development and an action service, the application in development executing on a server platform in one or more of a business process orchestration (BPO) engine, a rule engine, or a user interface engine, the process service decoupling the application in development from the one or more actions and allowing the application in development and the one or more actions to be updated and/or changed independent of one another; and
invoke, by the application in development, one of the actions in the registry,
the invoking occurring by:
delegating the invoking of the action to the process service, the process service looking up the definition of the invoked action based on a process identification (ID) and an activity ID specified by the application in development, the process service creating an execution context and calling an execute method in the action service,
wherein the action service discovers the invoked action using the application service registrar to perform an action type name look up in the registry, the action service ensuring that a number of arguments included in the action definition matches a number of arguments specified by the action type, and
wherein the action service passes an input to and receives a return value from the action, updates the output parameters map included in the definition of the invoked action, and returns the updated output parameters map to the application in development for updating processing variables in the application in development.

16. The medium of claim 15, wherein the instructions further cause the computing device to implement a marker interface service to identify services on which dynamic discovery of an action is performed.

17. The medium of claim 15, wherein the block of code includes at least one input parameter or output parameter, and wherein the instructions, when executed by the processor, cause the computing device to annotate a block of code with metadata including instructions that cause the computing device to provide a name for the at least one parameter.

18. The medium of claim 15, wherein the instructions, when executed by the processor, further cause the computing device to execute the action by the application in development, the execution including performing a method specified by the action.

19. The method of claim 1, further comprising executing the action by the application in development, the executing including performing a method specified by the action.

20. The system of claim 12, wherein the application in development further invokes the action by accessing the action in the service repository, and executes the action.

* * * * *